US011685045B1

(12) United States Patent
Herzog et al.

(10) Patent No.: US 11,685,045 B1
(45) Date of Patent: Jun. 27, 2023

(54) ASYNCHRONOUS ROBOTIC CONTROL USING MOST RECENTLY SELECTED ROBOTIC ACTION DATA

(71) Applicant: X Development LLC, Mountain View, CA (US)

(72) Inventors: Alexander Herzog, San Jose, CA (US); Dmitry Kalashnikov, Fair Lawn, NJ (US); Julian Ibarz, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 255 days.

(21) Appl. No.: 16/948,187

(22) Filed: Sep. 8, 2020

Related U.S. Application Data

(60) Provisional application No. 62/897,873, filed on Sep. 9, 2019.

(51) Int. Cl.
*B25J 9/16* (2006.01)

(52) U.S. Cl.
CPC ............ *B25J 9/161* (2013.01); *B25J 9/163* (2013.01); *B25J 9/1661* (2013.01); *B25J 9/1669* (2013.01); *B25J 9/1697* (2013.01)

(58) Field of Classification Search
CPC ........................................................ B25J 9/161
USPC ................................................ 700/245–264
See application file for complete search history.

(56) References Cited

U.S. PATENT DOCUMENTS

| 8,849,452 | B2 * | 9/2014 | Takeda | B25J 9/1679 |
| | | | | 700/250 |
| 11,173,599 | B2 * | 11/2021 | Levine | G06N 3/045 |
| 11,461,589 | B1 * | 10/2022 | Bai | B25J 9/1671 |
| 11,468,286 | B2 * | 10/2022 | Lee | G06N 3/084 |
| 11,494,632 | B1 * | 11/2022 | Bai | B25J 9/1612 |
| 2006/0248026 | A1 * | 11/2006 | Aoyama | G05D 1/0221 |
| | | | | 706/12 |
| 2017/0252922 | A1 * | 9/2017 | Levine | G05B 13/027 |
| 2017/0252924 | A1 * | 9/2017 | Vijayanarasimhan | ....... |
| | | | | B25J 9/1697 |
| 2017/0334066 | A1 * | 11/2017 | Levine | G06V 10/454 |
| 2019/0084151 | A1 * | 3/2019 | Bai | B25J 9/1612 |

(Continued)

FOREIGN PATENT DOCUMENTS

| CA | 3016418 | C | * | 4/2020 | ............. | B25J 9/161 |
| EP | 3401847 | A1 | * | 11/2018 | ......... | G05B 19/0423 |

(Continued)

*Primary Examiner* — Jonathan L Sample
(74) *Attorney, Agent, or Firm* — Gray Ice Higdon

(57) ABSTRACT

Asynchronous robotic control utilizing a trained critic network. During performance of a robotic task based on a sequence of robotic actions determined utilizing the critic network, a corresponding next robotic action of the sequence is determined while a corresponding previous robotic action of the sequence is still being implemented. Optionally, the next robotic action can be fully determined and/or can begin to be implemented before implementation of the previous robotic action is completed. In determining the next robotic action, most recently selected robotic action data is processed using the critic network, where such data conveys information about the previous robotic action that is still being implemented. Some implementations additionally or alternatively relate to determining when to implement a robotic action that is determined in an asynchronous manner.

20 Claims, 8 Drawing Sheets

(56) References Cited

U.S. PATENT DOCUMENTS

| | | | |
|---|---|---|---|
| 2019/0184570 A1* | 6/2019 | Yung | B25J 9/163 |
| 2019/0232488 A1* | 8/2019 | Levine | B25J 9/163 |
| 2019/0251437 A1* | 8/2019 | Finn | G06N 3/045 |
| 2020/0061811 A1* | 2/2020 | Iqbal | B25J 9/1612 |
| 2020/0122321 A1* | 4/2020 | Khansari Zadeh | B25J 9/1697 |
| 2020/0306980 A1* | 10/2020 | Choi | B25J 9/1697 |
| 2021/0023707 A1* | 1/2021 | Ma | B25J 9/1671 |

FOREIGN PATENT DOCUMENTS

| | | | |
|---|---|---|---|
| WO | 2019241680 | 12/2019 | |
| WO | WO-2019241680 A1 * | 12/2019 | B25J 9/1602 |

* cited by examiner

ASYNCHRONOUS ROBOTIC CONTROL USING MOST RECENTLY SELECTED ROBOTIC ACTION DATA

BACKGROUND

Techniques have been proposed for using reinforcement learning to train a critic network (e.g., a trained neural network model approximating a state-action value function) that, when trained, can be utilized by a robot in performing a robotic task in which the robot interacts with one or more environmental objects. Such a robotic task can be robotic grasping, or other non-grasping robotic tasks such as opening a door, throwing a ball, pushing objects, etc.

In some reinforcement learning approaches, in performing the robotic task, the trained critic network can be used to process state-action pairs that each include current state data (e.g., vision data and/or other data) along with a corresponding one of N sampled candidate actions (e.g., sampled using the cross-entropy method (CEM) and/or other technique(s)). A corresponding value is generated for each of the sampled candidate actions based on the processing of the sampled candidate action and the robot state data. The candidate action corresponding to the best generated value can be selected for implementation by the robot. Upon completion of implementing the candidate action, the process can then be repeated to select a next candidate action to be implemented by the robot. This can continue until, for example, a candidate action is selected that corresponds to a termination action, thereby enabling a sequence of actions to be sequentially selected and sequentially implemented in performing the robotic task.

One non-limiting example of a reinforcement learning approach proposed for robotic control is QT-Opt. QT-Opt is a distributed Q-Learning algorithm suitable for continuous action spaces. The QT-Opt approach trains a parameterized state-action value function $Q\theta(s,a)$ which is represented by a neural network model with parameters $\theta$. CEM is used to iteratively optimize and select the best action for a given Q function:

$$\pi_\theta(s)=Q_\theta(s,a') \quad (1)$$

In order to train the Q function, a separate process called the "Bellman updater" samples transition tuples (s, a, r, s') containing the state s, action a, reward r and next state s' from a replay buffer and generates Bellman target values according to a Q-learning algorithm, such as:

$$\hat{Q}(s,a,r,s')=r+\gamma V_\theta(s') \quad (2)$$

where $V_\theta(s')=Q_\theta(s',\pi_\theta(s'))$. These target values are pushed to another replay buffer D, and a separate training process optimizes the Q-value function against a training objective:

$$E(\theta)=E_{\hat{Q}(s,a,r,s')\sim D}[D(Q_\theta(s,a), \hat{Q}(s,a,r,s'))] \quad (3)$$

However, implementations of QT-Opt and/or of other reinforcement learning techniques are often used to control robots in a blocking manner. That is, a next best action (as determined using a trained critic network), to be implemented by the robot in controlling the robot to perform a robotic task, is only determined upon completion of implementation of a previous robotic action determined using the critic network. Waiting until completion of implementation of the previous robotic action before determining a next robotic action can be sufficient for simulation environments where time can be effectively stopped and resumed. However, for real robots in real environments there is latency in determining the next best robotic action to implement. While some real robots can be decelerated to zero velocity while a next best action to implement is being determined, this can have one or more drawbacks. For example, decelerating to zero velocity can expedite wear and tear to robotic components, can cause delay in performing the robotic task (e.g., as a result of the collective latencies in determining the next best actions), and/or can result in delayed reaction to dynamic environmental changes (e.g., as a result of only determining next best actions at the completion of implementation of a prior action).

SUMMARY

Implementations disclosed herein are related to asynchronous robotic control utilizing a trained critic network that is a machine learning model that approximates a state-action value function. In those implementations, during performance of a robotic task based on a sequence of robotic actions determined utilizing the trained critic network, a corresponding next robotic action of the sequence is determined while a corresponding previous robotic action of the sequence is still being implemented. In other words, asynchronous robotic control disposes of the need to await completion of implementation of the previous robotic action before starting to determine a next robotic action. Rather, with asynchronous robotic control, starting to determine the next robotic action occurs before implementation of the previous robotic action is completed. Moreover, in some iterations and/or implementations, not only can determining the next robotic action begin before implementation of the previous robotic action is completed, but the next robotic action can be fully determined before implementation of the previous robotic action is completed. For example, before implementation of the previous robotic action is completed, multiple candidate actions can be sampled utilizing the critic network, and a best (according to the sampling) candidate action selected before implementation of the previous robotic action is completed. Further, in some iterations and/or implementations, the next robotic action can begin to be implemented even before the previous robotic action is completed.

As referenced in the background above, various techniques have been proposed that, at the completion of each prior robotic action, select a new robotic action by sampling a plurality of candidate action using CEM and/or other technique(s). In determining the robotic action to implement at a next iteration, each of the sampled robotic actions is processed, utilizing a trained critic network and along with vision data and/or other sensor data, to generate a corresponding value. The sampled robotic action with the "best" corresponding value (e.g., highest or lowest depending on the implementation) can then be selected and implemented.

Implementations disclosed herein process not only a candidate robotic action and corresponding state data, but also process "most recently selected robotic action data". "Most recently selected robotic action data", as used herein, is data that conveys information about the robotic action that was determined in a most recent iteration of determining a robotic action during performance of a robotic task—and that is still being implemented during a current iteration of determining of the next robotic action. The most recently selected robotic action data can include the most recently selected robotic action itself. For example, the most recently selected robotic action itself can be a vector representing a target next state of the robot, that is defined by the most recently selected robotic action. The target next state of the robot is a state of one or more components of the robot (e.g., as a whole and/or of end effector(s) or other component(s)) and can include pose, velocity, acceleration, jerk and/or other state value(s) of the component(s). The most recently selected robotic action data can additionally or alternatively include a difference between the target next state of the robot, and a current state of the robot. For example, the difference can be represented as a vector. The current state of the robot is a state of one or more components of the robot, detected during implementation the most recently selected robotic action that is still being implemented, and can include pose, velocity, acceleration, jerk and/or other state value(s) of the component(s). However, in some implementations or iterations the current state of the robot may not be the most recently detected state. For example, it can instead be the detected state of the robot that is closest temporally to most recent vision data (captured during implementation of the most recently selected robotic action) that is processed using the critic network in a current iteration.

As one particular example, during controlling of a robot to implement a most recently selected robotic action and prior to the robot achieving the target next state of the robot defined by the most recently selected robotic action, current vision data can be determined. The current vision data is captured by a vision component of the robot during the implementation of the most recently selected robotic action and thus reflects changes to the robot and/or to the environment as a result of controlling of the robot to implement the most recently selected robotic action. Further, a current state of the robot can be determined, such as a current state that is closest (temporally) to the current vision data. It is noted that the current robot state that is closest (temporally) to the current vision data may not be the most recently detected current state of the robot since, for example, vision data may be generated at a lower frequency than robot state data. Most recently selected robotic action data can be determined that is a vector that defines a difference between the target next state of the robot and the determined current state of the robot.

One or more candidate robotic actions can then be sampled by processing, utilizing the trained critic network, a corresponding candidate robotic action along with the current vision data and the vector that defines the difference between the target next state of the robot and the determined current state of the robot. The processing of each corresponding candidate robotic action generates a corresponding value, and the corresponding candidate robotic action with the best value can be selected as the next robotic action to be implemented.

Utilizing the difference between the target next state and the determined current state (and/or other most recently selected robotic action data) provides the critic network with information on how the state of robot and world are progressing while the next action is being computed. Such information enables the robotic action to be performed in an asynchronous manner without sacrificing success rate of the robotic action. Accordingly, in these and other manners, the state space that is considered in determining robotic actions to implement is effectively expanded to include not only current state data (e.g., current vision data and/or current robot component pose(s)), but to also include most recently selected robotic action data that reflects feature(s) of the most recently selected robotic action that is currently being implemented. Thus, implementations disclosed herein relate to determining and/or utilizing (with a critic network) most recently selected robotic action data during asynchronous robotic control and/or to training the critic network for performance with most recently selected robotic action data.

Some implementations disclosed herein additionally or alternatively relate to determining when to implement a robotic action that is determined in an asynchronous manner. For example, in many situations a next robotic action to be implemented can be determined during implementation of a prior robotic action and before completion of implementation of the prior robotic action. Some implementations may not automatically implement the next robotic action at the control cycle that occurs immediately after determining the next robotic action. Rather, those implementations can instead implement the next robotic action at a particular control cycle based on one or more considerations. The particular control cycle determined could be the control cycle that occurs immediately after determining the next robotic action, or could be a later control cycle. For example, the particular control cycle can be determined as the control cycle for implementation responsive to determining that a minimum amount of time and/or control cycles have passed since: (a) initiation of generating the value for the candidate next robotic action and/or (b) beginning controlling the robot to implement the most recently selected robot action. In other words, the particular control cycle can be determined to achieve at least a minimum amount of delay before shifting to controlling the robot based on a newly selected robotic action. This can result in more efficient training of the critic network and/or better performance of the critic network. This can be a result of, for example, ensuring at least the minimum delay, which can enable the critic network to better learn correlations between the data processed in determining the next robotic action, and actual implementation of the next robotic action. Absent enforcing this minimum delay (and instead always implementing at the next control cycle that follows determination of the robotic action), irregular timing of controlling based on next robotic actions can occur. This can be a result of, for example, processing using the critic network to determine the next action varying over time on a given robot (e.g., as a result of different loads on the robot) and/or varying from robot to robot (e.g., as a result of differing processing capabilities).

As one particular example, determining a next robotic action can always begin X milliseconds or X control cycles after implementation of the previous robotic action begins. Further, the determined next robotic action can always be implemented Y milliseconds or Y control cycles after the implementation of the previous robotic action begins or at the next control cycle after completing determining the next robotic action if Y milliseconds or Y control cycles have already been completed. For instance, assume determining a next robotic action always begins 5 control cycles after implementation of the previous robotic action begins and the determined next action is always implemented at the later occurring of: 11 control cycles after implementation of the previous robotic action begins, or determining the next robotic action is completed. In such an instance, if determining the next robotic action is completed between the 9th and 10th control cycles, the next robotic action will be implemented at the 11th control cycle, while bypassing implementation of the next robotic action at the 10th control cycle (despite it being determined before the 10th control cycle). If determining the next robotic action is completed between the 10th and 11th control cycles, the next robotic action will be implemented at the next control cycle since it is the 11th control cycle. If determining the next robotic action is completed after the 11th control cycle, the next robotic action will be implemented at the next control cycle since it is the 11th control cycle (and not the 10th).

Again, such techniques can promote more consistency amongst next action determinations, enabling more efficient training of the critic network and/or better performance of the critic network. For example, compare such techniques to an alternate technique that instead always begins determining a next robotic action 5 control cycles after implementation of the previous robotic action, but implements the determined next robotic action immediately upon completing determining the next robotic action. In such an alternate technique, the control cycle in which the next robot action is implemented can vary wildly from iteration to iteration on a given robot. For example, depending on the processor load during iterations, a next action in one iteration could be implemented 7 control cycles after implementation of the previous robotic action while the next action in another iteration could be implemented 12 control cycles after implementation of the previous robotic action. Moreover, in such an alternate technique, the control cycle in which the next robot action is implemented can vary wildly amongst robots (e.g., in dependence on their capabilities), which can lead to inconsistencies in episodes used for training data collection (e.g., online task episodes). Moreover, other alternative techniques that instead implement a next robotic action at the control cycle that follows completion of the implementation of the previously determined robotic action can also present large variations. This can be due to, for example, different robotic actions taking different durations to implement.

Asynchronous robotic control according to implementations disclosed herein can achieve various technical benefits. As one example, asynchronous robotic control can mitigate occurrences of a robot needing to be decelerated to zero velocity while a next best action to implement is being determined. This can mitigate wear and tear on various robotic components. This can additionally or alternatively mitigate occurrences of jerky (or otherwise suboptimal) captured vision data that can be caused by the deceleration (e.g., where a corresponding vision component is jarred as a result of the deceleration). Suboptimal vision data can adversely impact downstream robotic control that is based on the suboptimal vision data. As another example, asynchronous robotic control can shorten overall duration of completing a robotic task by mitigating occurrences of decelerating to zero velocity and/or by mitigating occurrences of awaiting a next robotic action to be implemented after completion of implementing a prior robotic action. As yet another example, asynchronous robotic control can enable quicker reaction to changes in a dynamic environment and/or can result in more fluent movements of the robot in performing the robotic task. This can be a result of, for example, generating a greater quantity of individual robotic control actions during asynchronous robotic control.

In various implementations disclosed herein, off-policy deep reinforcement learning is used to train the critic network, and the off-policy deep reinforcement learning is based on self-supervised data collection (e.g., using only self-supervised data). On-policy deep reinforcement learning can also be used to train the critic network, and can optionally be interspersed with the off-policy deep reinforcement learning as described herein. The self-supervised data utilized in the off-policy deep reinforcement learning can be based on sensor observations from real-world robots in performance of episodes of the robotic task, and can optionally be supplemented with self-supervised data from robotic simulations of performance of episodes of the robotic task. Through off-policy training, large-scale autonomous data collection, and/or other techniques disclosed herein, implementations can learn policies that generalize effectively to previously unseen objects, previously unseen environments, etc.

The critic network can be a machine learning model, such as a neural network model. Moreover, as described herein, implementations of the reinforcement learning utilized in training the neural network model utilize a continuous-action variant of Q-learning. Accordingly, the critic network can represent the Q-function. Implementations disclosed herein train and utilize the critic network for performance of closed-loop vision-based control, where a robot continuously updates its task strategy based on vision data observations to optimize long-horizon task success. In some of those implementations, the critic network is trained to predict the value of an action in view of current state data, where the current state data includes most recently selected robotic action data as described herein. For example, the action and the state data can both be processed using the critic network to generate a value that is a prediction of the value in view of the current state data.

As mentioned above, the current state data can include most recently selected robotic action data that conveys information about the robotic action that was determined in a most recent iteration of determining a robotic action during performance of a robotic task—and that is still being implemented during a current iteration of determining of the next robotic action. The state data can additionally include, for example, vision data captured by a vision component of the robot (e.g., a 2D image from a monographic camera, a 2.5D image from a stereographic camera, and/or a 3D point cloud from a 3D laser scanner). The state data can also optionally include additional data such as whether a grasping end effector of the robot is open or closed. The robotic action can include a pose change for a component of the robot, such as pose change, in Cartesian space, for a grasping end effector of the robot. The pose change can be defined by the robotic action as, for example, a translation difference (indicating a desired change in position) and a rotation difference (indicating a desired change in azimuthal angle). The robotic action can further include, for example, a component action command that dictates one or more movements, of the component, that are in addition to translation and rotation of the component. For instance, the component action command can indicate whether a gripper is to be opened, closed, or adjusted to a target state between opened and closed (e.g., partially closed). The robotic action can further include a termination command that dictates whether to terminate performance of the robotic task.

As described herein, the critic network can be trained in view of a reward function that can assign a positive reward (e.g., "1") or a negative reward (e.g., "0") at the last time step of an episode of performing a task. The last time step is one where a termination action occurred, as a result of an action determined based on the critic indicating termination, or based on a maximum number of time steps occurring. Various self-supervision techniques can be utilized to assign the reward. For example, for a grasping task, at the end of an episode the gripper can be moved out of the view of the camera and a first image captured when it is out of the view. Then the gripper can be returned to its prior position and "opened" (if closed at the end of the episode) to thereby drop any grasped object, and a second image captured. The first image and the second image can be compared, using background subtraction and/or other techniques, to determine whether the gripper was grasping an object (e.g., the object would be present in the second image, but not the first)—and an appropriate award assigned to the last time step. In some implementations, the reward function can assign a small penalty (e.g., −0.05) for all time steps where the termination action is not taken. The small penalty can encourage the robot to perform the task quickly.

To enable the critic network to learn generalizable strategies, it is trained on a diverse set of data representing various objects and/or environments. For example, a diverse set of objects can be needed to enable the critic network to learn generalizable strategies for grasping, such as picking up new objects, performing pre-grasp manipulation, and/or handling dynamic disturbances with vision-based feedback. Implementations disclosed herein utilize a continuous-action generalization of Q-learning. Unlike other continuous action Q-learning methods, which are often unstable, the continuous action generalization dispenses with the need to train an explicit actor, and instead uses stochastic optimization to select actions (during inference) and target Q-values (during training). Moreover, training can be performed off-policy, which makes it possible to pool experience from multiple robots and multiple experiments. For example, the data used to train the critic network can be collected over multiple robots operating over long durations. Even fully off-policy training can provide improved performance for task performance, while a moderate amount of on-policy fine-tuning can further improve performance.

In various implementations, during inference, stochastic optimization is utilized to stochastically select actions to evaluate in view of a current state and using the critic network—and to stochastically select a given action (from the evaluated actions) to implement in view of the current state. For example, the stochastic optimization can be a derivative-free optimization algorithm, such as the cross-entropy method (CEM). CEM samples a batch of N values at each iteration, fits a Gaussian distribution to the best M<N of these samples, and then samples next batch of N from that Gaussian. As one non-limiting example, N can be 64 and M can be 6. During inference, CEM can be used to select 64 candidate actions, those actions evaluated in view of a current state and using the critic network, and the 6 best can be selected (e.g., the 6 with the highest Q-values generated using the critic network). A Gaussian distribution can be fit to those 6, and 64 more actions selected from that Gaussian. Those 64 actions can be evaluated in view of the current state and using the critic network, and the best one (e.g., the one with the highest Q-value generated using the critic network) can be selected as the action to be implemented. The preceding example is a two iteration approach with N=64 and M=6. Additional iterations can be utilized, and/or alternative N and/or M values.

In various implementations, during training, stochastic optimization is utilized to determine a target Q-value for use in generating a loss for a state, action pair to be evaluated during training. For example, stochastic optimization can be utilized to stochastically select actions to evaluate—and to stochastically select a Q-value that corresponds to a given action (from the evaluated actions). The target Q-value can be determined based on the selected Q-value. For example, the target Q-value can be a function of the selected Q-value and the reward (if any) for the state, action pair being evaluated.

The above description is provided as an overview of only some implementations disclosed herein. These and other implementations are described in more detail herein.

Other implementations may include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations may include a system of one or more computers and/or one or more robots that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
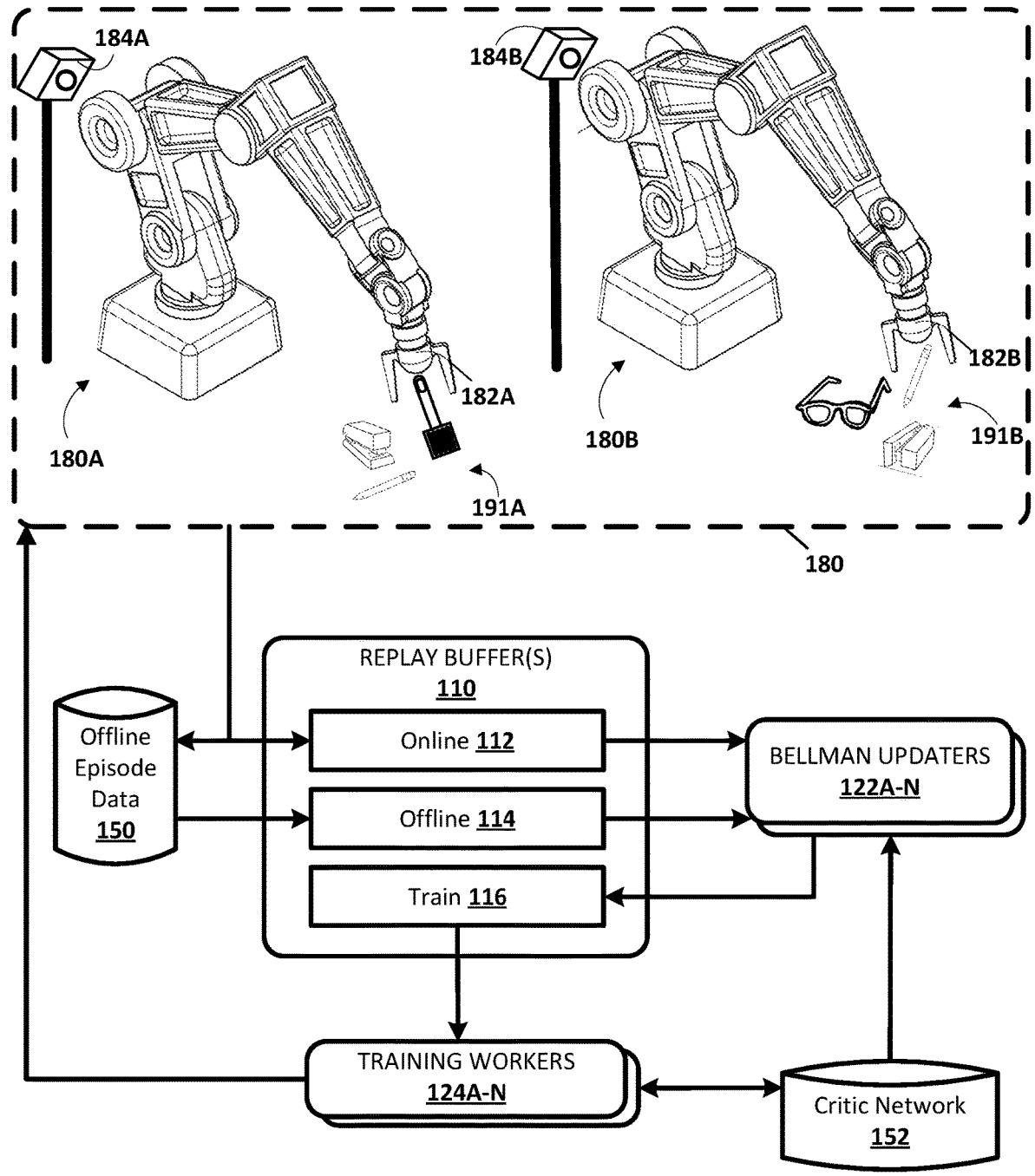
FIG. 1 illustrates an example environment in which implementations disclosed herein can be implemented.

FIG. 1 illustrates robots 180, which include robots 180A, 180B, and optionally other (unillustrated) robots. Robots 180A and 180B are "robot arms" having multiple degrees of freedom to enable traversal of grasping end effectors 182A and 182B along any of a plurality of potential paths to position the grasping end effectors 182A and 182B in desired locations. Robots 180A and 180B each further controls the two opposed "claws" of their corresponding grasping end effector 182A, 182B to actuate the claws between at least an open position and a closed position (and/or optionally a plurality of "partially closed" positions).

Example vision components 184A and 184B are also illustrated in FIG. 1. In FIG. 1, vision component 184A is mounted at a fixed pose relative to the base or other stationary reference point of robot 180A. Vision component 184B is also mounted at a fixed pose relative to the base or other stationary reference point of robot 180B. Vision components 184A and 184B each include one or more sensors and can generate vision data related to shape, color, depth, and/or other features of object(s) that are in the line of sight of the sensors. The vision components 184A and 184B may be, for example, monographic cameras, stereographic cameras, and/or 3D laser scanners. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor.

The vision component 184A has a field of view of at least a portion of the workspace of the robot 180A, such as the portion of the workspace that includes example objects 191A. Although resting surface(s) for objects 191A are not illustrated in FIG. 1, those objects may rest on a table, a tray, and/or other surface(s). Objects 191A include a spatula, a stapler, and a pencil. In other implementations more objects, fewer objects, additional objects, and/or alternative objects may be provided during all or portions of grasp episodes (or other task episodes) of robot 180A as described herein. Moreover, in many implementations objects 191A can be replaced (e.g., by a human or by another robot) with a different set of objects periodically to provide diverse training data.

The vision component 184B has a field of view of at least a portion of the workspace of the robot 180B, such as the portion of the workspace that includes example objects 191B. Although resting surface(s) for objects 191B are not illustrated in FIG. 1, they may rest on a table, a tray, and/or other surface(s). Objects 191B include a pencil, a stapler, and glasses. In other implementations more objects, fewer objects, additional objects, and/or alternative objects may be provided during all or portions of grasp episodes (or other task episodes) of robot 180B as described herein. Moreover, in many implementations objects 191B can be replaced (e.g., by a human or by another robot) with a different set of objects periodically to provide diverse training data.

Although particular robots 180A and 180B are illustrated in FIG. 1, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth.

Also, although particular grasping end effectors are illustrated in FIG. 1, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision sensors 184A and 184B are illustrated in FIG. 1, additional and/or alternative mountings may be utilized. For example, in some implementations, vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a large quantity of grasp episodes and data associated with the grasp episodes can be stored in offline episode data database 150 and/or provided for inclusion in online buffer 112 (of replay buffer(s) 110), as described herein. As described herein, robots 180A and 180B can optionally initially perform grasp episodes (or other task episodes) according to a scripted exploration policy, in order to bootstrap data collection. The scripted exploration policy can be randomized, but biased toward reasonable grasps. Data from such scripted episodes can be stored in offline episode data database 150 and utilized in initial training of critic network 152 to bootstrap the initial training.

Robots 180A and 180B can additionally or alternatively perform grasp episodes (or other task episodes) using the critic network 152, and data from such episodes provided for inclusion in online buffer 112 during training and/or provided in offline episode data database 150 (and pulled during training for use in populating offline buffer 114). For example, the robots 180A and 180B can utilize method 300 of FIG. 3 in performing such episodes. The episodes provided for inclusion in online buffer 112 during training will be online episodes. However, the version of the critic network 152 utilized in generating a given episode can still be somewhat lagged relative to the version of the critic network 152 that is trained based on instances from that episode. The episodes stored for inclusion in offline episode data database 150 will be an offline episode and instances from that episode will be later pulled and utilized to generate transitions that are stored in offline buffer 114 during training.

The data generated by a robot 180A or 180B during an episode can include state data, robotic actions, and rewards. Each instance of state data for an episode includes at least vision-based data for an instance of the episode, and most recently selected robotic action(s) data that is based on selected robotic action(s) for previous instance(s) of the episode. For example, an instance of state data can include a 2D image when a vision component of a robot is a monographic camera. Each instance of state data can optionally include additional data such as whether a grasping end effector of the robot is open or closed at the instance. More formally, a given state observation can be represented as $s \in S$.

Each of the robotic actions for an episode defines a robotic action that is implemented in the current state to transition to a next state (if any next state). A robotic action can include a pose change for a component of the robot, such as pose change, in Cartesian space, for a grasping end effector of the robot. The pose change can be defined by the action as, for example, a translation difference (indicating a desired change in position) and a rotation difference (indicating a desired change in azimuthal angle). The robotic action can further include, for example, a component action command that dictates, for instance whether a gripper is to be opened, closed, or adjusted to a target state between opened and closed (e.g., partially closed). The robotic action can further include a termination command that dictates whether to terminate performance of the robotic task. The terminal state of an episode will include a positive termination command to dictate termination of performance of the robotic task.

More formally, a given robotic action can be represented as $a \in A$. In some implementations, for a grasping task, A includes a vector in Cartesian space $t \in R^3$ indicating the desired change in the gripper position, a change in azimuthal angle encoded via a sine-cosine encoding $r \subset R^3$, binary gripper open and close commands gopen and gclose and a termination command e that ends the episode, such that a=(t, r, gopen and gclose, e).

Each of the rewards can be assigned in view of a reward function that can assign a positive reward (e.g., "1") or a negative reward (e.g., "0") at the last time step of an episode of performing a task. The last time step is one where a termination action occurred, as a result of an action determined based on the critic network indicating termination, or based on a maximum number of time steps occurring. Various self-supervision techniques can be utilized to assign the reward, such as those described herein.

Also illustrated in FIG. 1 is the offline episode data database 150, the replay buffer(s) 110, bellman updaters 122A-N, training workers 124A-N, and a critic network 152. It is noted that all components of FIG. 1 are utilized in training the critic network 152. However, once the critic network 152 is trained (e.g., considered optimized according to one or more criteria), the robots 180A and/or 180B can perform a robotic task using the critic network 152 and without other components of FIG. 1 being present.

As mentioned herein, the critic network 152 can be a deep neural network model, such as the deep neural network model that approximates a Q-function that can be represented as $Q_\theta(s, a)$ where $\theta$ denotes the learned weights in the neural network model. Implementations of reinforcement learning described herein seek the optimal Q-function ($Q_\theta(s, a)$) by minimizing the Bellman error. This generally corresponds to double Q-learning with a target network, a variant on the standard Bellman error, where $Q_{\bar{\theta}}$ is a lagged target network. The expectation is taken under some data distribution, which in practice is simply the distribution over all previously observed transitions. Once the Q-function is learned, the policy can be recovered according to $\pi(s)=\arg\max_a Q(s, a)$.

Q-learning with deep neural network function approximators provides a simple and practical scheme for reinforcement learning with image observations, and is amenable to straightforward parallelization. However, incorporating continuous actions, such as continuous gripper motion in grasping tasks, poses a challenge for this approach. The approach utilized in some implementations described herein is an alternative approach that maintains the generality of non-convex Q-functions while avoiding the need for a second maximizer network. In the approach, a state s and action a are inputs into the critic network, and the max in Equation (3) below is evaluated by means of a stochastic optimization algorithm that can handle non-convex and multimodal optimization landscapes.

Large-scale reinforcement learning that requires generalization over new scenes and objects requires large amounts of diverse data. Such data can be collected by operating robots 180 over a long duration and storing episode data in offline episode data database 150.

To effectively ingest and train on such large and diverse datasets, a distributed, asynchronous implementation can be utilized. A plurality of log readers (not illustrated) operating in parallel can read historical data from offline episode data 150 to generate transitions that it pushes to offline buffer 114 of replay buffer. In some implementations, log readers can each perform one or more steps of method 200 of FIG. 2.

Further, online transitions can optionally be pushed, from robots 180, to online buffer 112. The online transitions can also optionally be stored in offline episode data database 150 and later read by log readers, at which point they will be offline transitions.

A plurality of bellman updaters 122A-N operating in parallel sample transitions from the offline and online buffers 114 and 112. In various implementations, this is a weighted sampling (e.g., a sampling rate for the offline buffer 114 and a separate sampling rate for the online buffer 112) that can vary with the duration of training. For example, early in training the sampling rate for the offline buffer 114 can be relatively large, and can decrease with duration of training (and, as a result, the sampling rate for the online buffer 112 can increase). This can avoid overfitting to the initially scarce on-policy data, and can accommodate the much lower rate of production of on-policy data.

The Bellman updaters 122A-N label sampled data with corresponding target values, and store the labeled samples in a train buffer 116, which can operate as a ring buffer. In labeling a given instance of sampled data with a given target value, one of the Bellman updaters 122A-N can carry out the CEM optimization procedure using the current critic network (e.g., with current learned parameters). Note that one consequence of this asynchronous procedure is that the samples in train buffer 116 are labeled with different lagged versions of the current model. In some implementations, bellman updaters 122A-N can each perform one or more steps of method 400 of FIG. 4.

A plurality of training workers 124A-N operate in parallel and pull labeled transitions from the train buffer 116 randomly and use them to update the critic network 152. Each of the training workers 124A-N computes gradients and sends the computed gradients asynchronously to parameter server(s) (not illustrated). In some implementations, bellman updaters 122A-N can each perform one or more steps of method 500 of FIG. 5. The training workers 124A-N, the Bellman updaters 122A-N, and the robots 180 can pull model weights form the parameter server(s) periodically, continuously, or at other regular or non-regular intervals and can each update their own local version of the critic network 152 utilizing the pulled model weights.

Additional description of implementations of methods that can be implemented by various components of FIG. 1 is provided below with reference to the flowcharts of FIGS. 2-6.

Figure 2A:
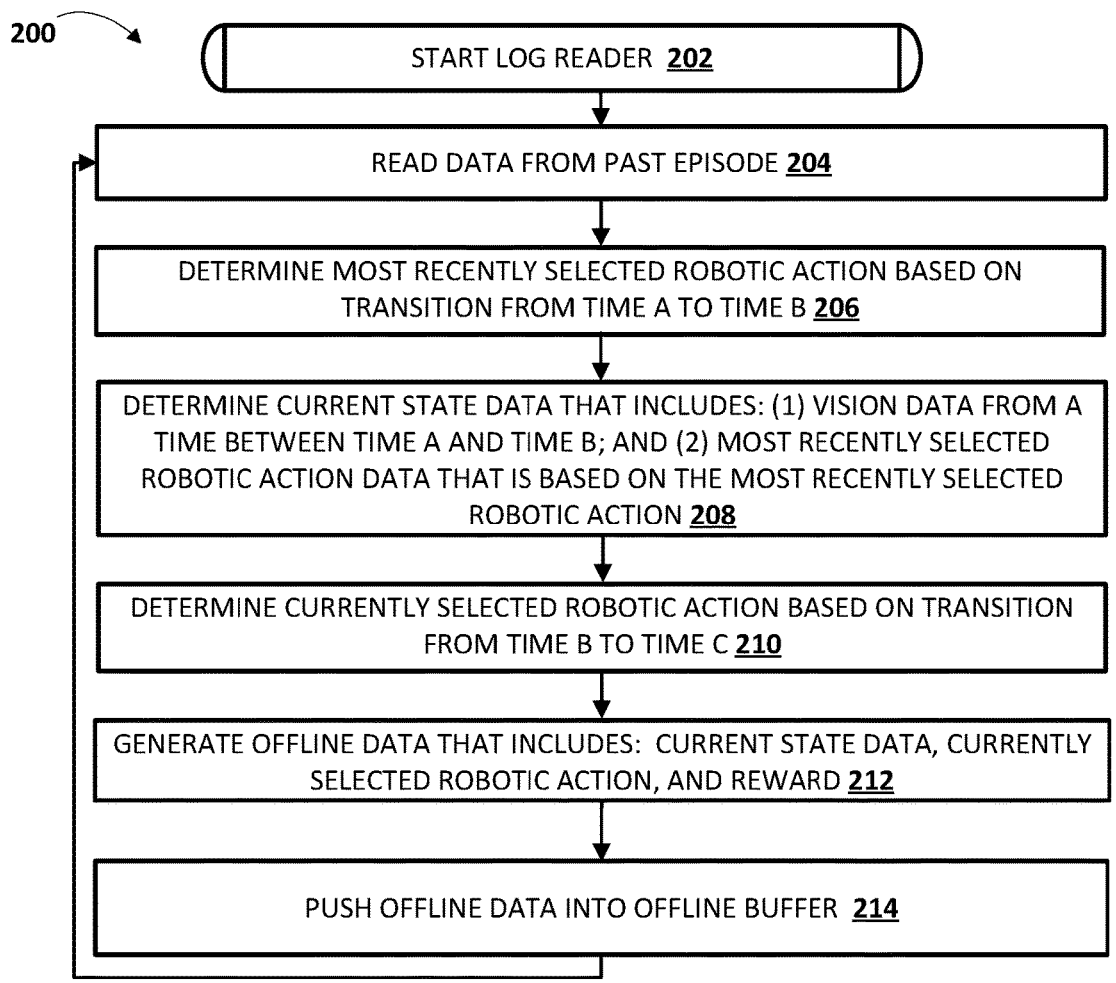
FIG. 2A is a flowchart illustrating an example method of converting stored past episode data into offline data for pushing to an offline buffer.

FIG. 2A is a flowchart illustrating an example method 200 of converting stored past episode data into offline data for pushing to an offline buffer (e.g., offline buffer 114 of FIG. 1). For convenience, the operations of the flow chart are described with reference to a system that performs the operations. This system may include one or more components of one or more computer systems, such as one or more processors. Moreover, while operations of method 200 are shown in a particular order, this is not meant to be limiting. One or more operations may be reordered, omitted or added.

At block 202, the system starts log reading. For example, log reading can be initialized at the beginning of reinforcement learning.

At block 204, the systems reads data from a past episode. For example, the system can read data from an offline episode data database that stores states, actions, and rewards from past episodes of robotic performance of a task. The past episode can be one performed by a corresponding real physical robot based on a past version of a critic network. The past episode can, in some implementations and/or situations (e.g., at the beginning of reinforcement learning) be one performed based on a scripted exploration policy, based on a demonstrated (e.g., through virtual reality, kinesthetic teaching, etc.) performance of the task, etc.

Figure 2B:
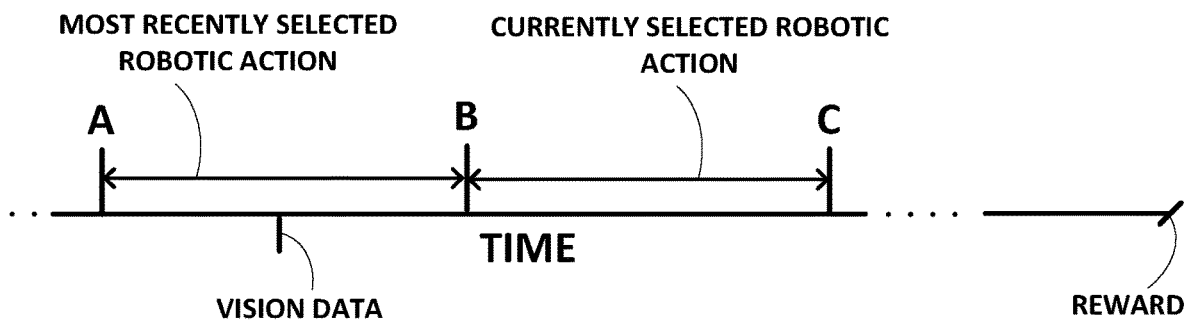
FIG. 2B is an example of how past episode data can be converted into offline data for pushing to an offline buffer.

At block 206, the system determines most recently selected robotic action(s) based on a robotic transition from time A of the past episode to time B of the past episode. For example, as illustrated in FIG. 2B, the most recently selected robotic action(s) can include robotic action(s) that occurred from time A to time B, such as translation and/or rotation of a gripper, opening and/or closing of the gripper, etc.

At block 208, the system determines current state data that includes: (1) vision data from a time between time A and time B; and (2) the most recently selected robotic action data that is based on the most recently selected robotic action(s) determined at block 206. For example, as illustrated in FIG. 2B, an instance of vision data can be selected based on it having a timestamp between time A and time B. In some implementations, the instance of vision data is selected based on it being at least the minimum delay (described herein) before time B. The most recently selected robotic action data can, in some implementations, include a vector representation of the most recently selected robotic action(s) determined at block 206. In some implementations, the most recently selected robotic action data can additionally or alternatively include a vector representation of a difference between a state of component(s) of the robot at time B, and a state of the component(s) at a time corresponding to the instance of vision data (e.g., having the same timestamp as the vision data—or a timestamp that is closest to the vision data). In other words, a vector representation that indicates a difference between the state of the component(s) at (or very near) a time the vision data of the state data was captured, and the state of the component(s) a time B.

At block 210, the system determines a currently selected robotic action based on a robotic transition from time B to time C. For example, as illustrated in FIG. 2B, the currently selected robotic action(s) can include robotic action(s) that occurred from time B to time C, such as translation and/or rotation of a gripper, opening and/or closing of the gripper, etc.

At block 212, the system generates offline data that includes: the current state data, the currently selected robotic action, and a reward for the episode. The reward can be determined as described herein, and can optionally be previously determined and stored with the data. For example, as illustrated in FIG. 2B the reward can be based on determining whether an attempted grasp (or other attempted task) was successful, based on analysis of various data after termination of the episode.

At block 214, the system pushes the offline data into an offline buffer. The system then returns to block 204 to read data from another past episode.

In various implementations, method 200 can be parallelized across a plurality of separate processors and/or threads.

Figure 3:
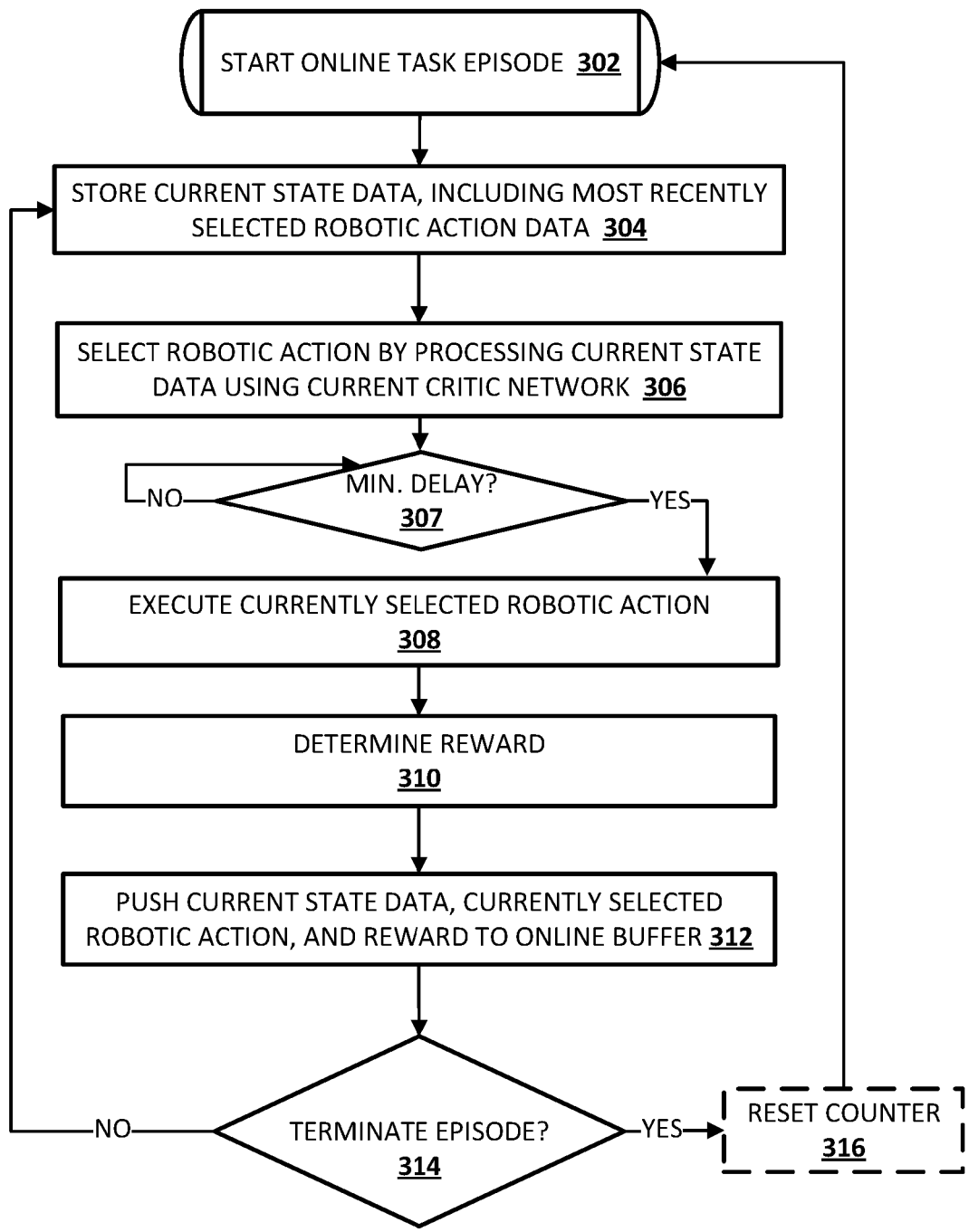
FIG. 3 is a flowchart illustrating an example method of performing an online critic-guided task episode, and pushing data from the online critic-guided task episode into an online buffer and optionally an offline buffer.

FIG. 3 is a flowchart illustrating an example method 300 of performing an online critic-guided task episode, and pushing data from the online critic-guided task episode into an online buffer and optionally an offline buffer. For convenience, the operations of the flow chart are described with reference to a system that performs the operations. This system may include one or more components of one or more robots, such as one or more processors of one of robots 180A and 180B. Moreover, while operations of method 300 are shown in a particular order, this is not meant to be limiting. One or more operations may be reordered, omitted or added.

At block 302, the system starts an online task episode.

At block 304, the system stores current state data for the online task episode. The current state data includes most recently selected robotic action data as described herein. At an initial iteration of block 304 the most recently selected robotic action data can be a zero vector or other "null" indication as there are no previously selected robotic action(s) at the initial iteration. The current state data can also include, for example, vision data captured by a vision component associated with the robot and/or current state(s) of robotic component(s).

At block 306, the system selects a robotic action by processing current state data using a current critic network. For example, the system can utilize a stochastic optimization technique (e.g., the CEM technique described herein) to sample a plurality of robotic actions using the current critic network, and can select the sampled action with the highest value generated using the current critic network.

At block 307, the system determines whether a minimum amount of delay has been achieved. In some implementations, the minimum amount of delay is relative to initiation of a most recent iteration of block 306 during the online task episode and/or relative to initiation of a most recent iteration of block 308 (described below) during the online task episode. In some implementations, block 307 can optionally be omitted at least in an initial iteration of block 307 during the online task episode.

If, at block 307, the system determines the minimum amount of delay has been achieved, the system proceeds to block 308 and executes the current selected robotic action. For example, the system can provide commands to one or more actuators of the robot to cause the robot to execute the robotic action. For instance, the system provide commands to actuator(s) of the robot to cause a gripper to translate and/or rotate as dictated by the robotic action and/or to cause the gripper to close or open as dictated by the robotic action (and if different than the current state of the gripper). In some implementations the robotic action can include a termination command (e.g., that indicates whether the episode should terminate) and if the termination command indicates the episode should terminate, the robotic action at block 308 can be a termination of the episode.

At block 310, the system determines a reward based on the system executing the robotic action using the current critic network. In some implementations, when the action is a non-terminal action, the reward can be, for example, "0" reward—or a small penalty (e.g., −0.05) to encourage faster robotic task completion. In some implementations, when the action is a terminal action, the reward can be a "0" if the robotic task was successful and a "1" if the robotic task was not successful. For example, for a grasping task the reward can be "1" if an object was successfully grasped, and a "0" otherwise.

The system can utilize various techniques to determine whether a grasp or other robotic task is successful. For example, for a grasp, at termination of an episode the gripper can be moved out of the view of the camera and a first image captured when it is out of the view. Then the gripper can be returned to its prior position and "opened" (if closed at the end of the episode) to thereby drop any grasped object, and a second image captured. The first image and the second image can be compared, using background subtraction and/or other techniques, to determine whether the gripper was grasping an object (e.g., the object would be present in the second image, but not the first)—and an appropriate award assigned to the last time step.

At block 312, the system pushes the current state data of block 304, the robotic action selected at block 306, and the reward of block 310 to an online buffer to be utilized as online data during reinforcement learning. At block 312, the system can also push the state of block 304, the robotic action selected at block 306, and the reward of block 310 to an offline buffer to be subsequently used as offline data during the reinforcement learning.

At block 314, the system determines whether to terminate the episode. In some implementations and/or situations, the system can terminate the episode if the robotic action at a most recent iteration of block 306 indicated termination. In some additional or alternative implementations and/or situations, the system can terminate the episode if a threshold quantity of iterations of blocks 304-312 have been performed for the episode and/or if other heuristics based termination conditions have been satisfied.

If, at block 314 the system determines not to terminate the episode, then the system returns to block 304. If, at block 314, the system determines to terminate the episode, then the system proceeds to block 302 to start a new online task episode. The system can, a block 316, optionally reset a counter that is used in block 314 to determine if a threshold quantity of iterations of blocks 304-312 have been performed.

In various implementations, method 300 can be parallelized across a plurality of separate real and/or simulated robots.

Figure 4:
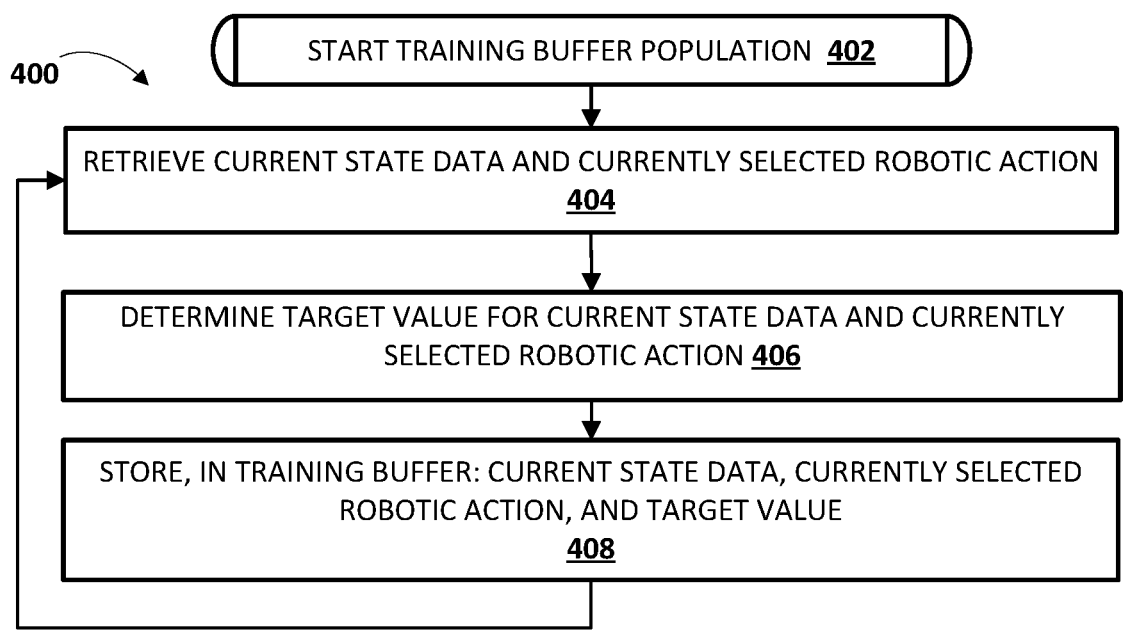
FIG. 4 is a flowchart illustrating an example method of using data from an online buffer or offline buffer in populating a training buffer with data that can be used to train a critic network.

FIG. 4 is a flowchart illustrating an example method 400 of using data from an online buffer or offline buffer in populating a training buffer with data that can be used to train a critic network. For convenience, the operations of the flow chart are described with reference to a system that performs the operations. This system may include one or more components of one or more computer systems, such as one or more processors replay buffer(s) 110 (FIG. 1). Moreover, while operations of method 400 are shown in a particular order, this is not meant to be limiting. One or more operations may be reordered, omitted or added.

At block 402, the system starts training buffer population.

At block 404, the system retrieves current state data and a currently selected robotic action. The current state data and a currently selected robotic action can be retrieved from an online buffer or an offline buffer. The online buffer can be one populated according to method 300 of FIG. 3. The offline buffer can be one populated according to the method 200 of FIG. 2. In some implementations, the system determines whether to retrieve from the online buffer of the offline buffer based on respective sampling rates for the two buffers. As described herein, the sampling rates for the two buffers can vary as reinforcement learning progresses.

At block 406, the system determines a target value based on the retrieved information from block 404. In some implementations, the system determines the target value using stochastic optimization techniques as described herein. In some implementations, the stochastic optimization technique is CEM. In some of those implementations, block 406 can include using stochastic optimization to generate values for each of a plurality of actions. The value for each of the actions is determined by processing, using a version of the critic network, the current state data (including the most recently selected robotic action data) along with a corresponding one of the actions. The system can then select the maximum value and determine the target value based on the maximum value. In some implementations, the system determines the target value as a function of the max value and a reward included in the data retrieved at block 404.

At block 408, the system stores, in a training buffer, current state data (including the most recently selected robotic action data), a currently selected robotic action, and the target value determined at block 406. The system then proceeds to block 404 to perform another iteration of blocks 404 and 406.

In various implementations, method 400 can be parallelized across a plurality of separate processors and/or threads. Also, although method 200, 300, and 400 are illustrated in separate figures herein for the sake of clarity, it is understood that in many implementations methods 200, 300, and 400 are performed in parallel during reinforcement learning.

Figure 5:
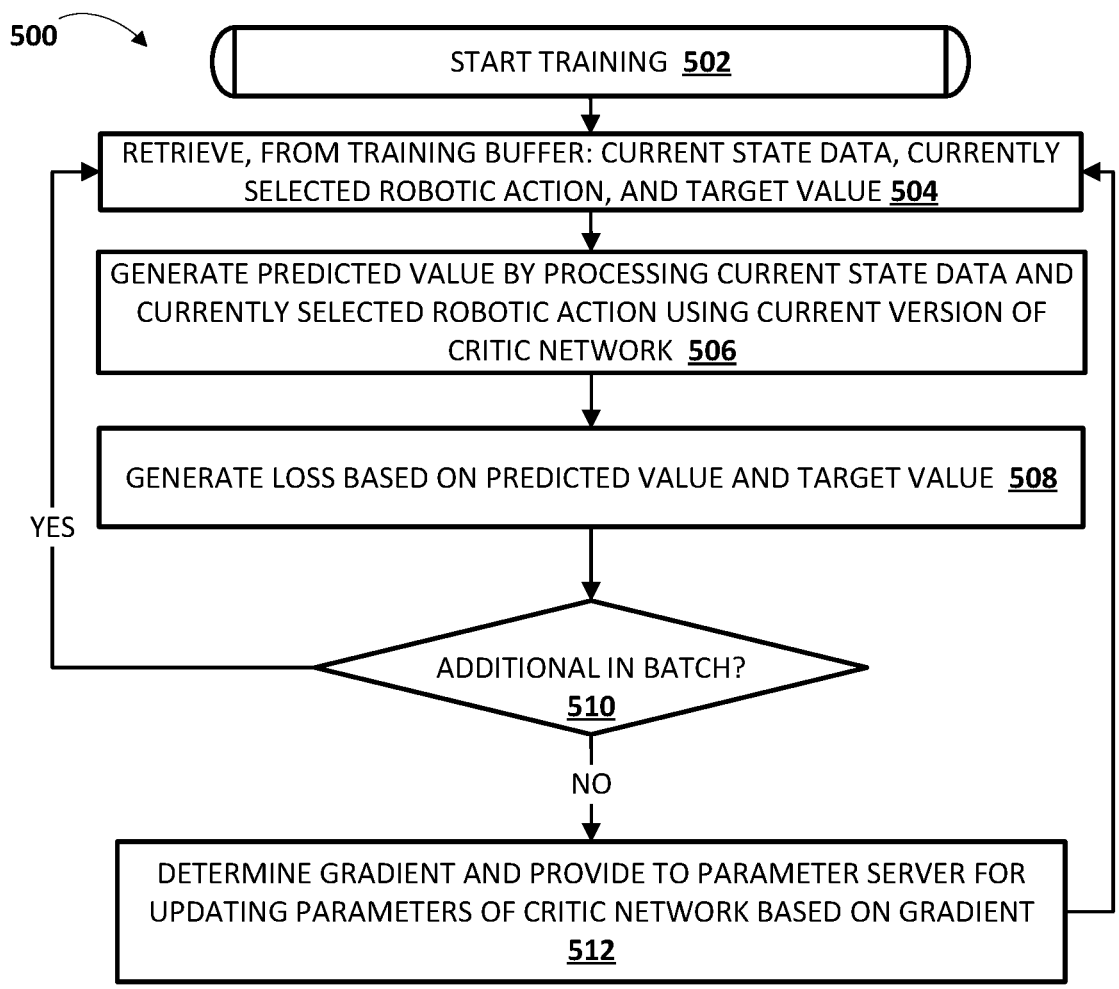
FIG. 5 is a flowchart illustrating an example method of training a critic network.

FIG. 5 is a flowchart illustrating an example method 500 of training a critic network. For convenience, the operations of the flow chart are described with reference to a system that performs the operations. This system may include one or more components of one or more computer systems, such as one or more processors of one of training workers 124A-N and/or parameter servers. Moreover, while operations of method 500 are shown in a particular order, this is not meant to be limiting. One or more operations may be reordered, omitted or added.

At block 502, the system starts training the critic network.

At block 504, the system retrieves, from a training buffer, current state data (including the most recently selected robot action data), a currently selected robotic action, and a target value.

At block 506, the system generates a predicted value by processing the current state data and the currently selected robotic action using a current version of the critic network. It is noted that in various implementations the current version of the critic network utilized to generate the predicted value at block 506 will be updated relative to the model utilized to generate the target value that is retrieved at block 504. In other words, the target value that is retrieved at block 504 will be generated based on a lagged version of the critic network.

At block 508, the system generates a loss value based on the predicted value and the target value. For example, the system can generate a log loss based on the two values.

At block 510, the system determines whether there is an additional current state data (including the most recently selected robot action data), currently selected robotic action, and target value to be retrieved for the batch (where batch techniques are utilized). If the decision at block 510 is yes, then the system performs another iteration of blocks 504, 506, and 508. If the decision is no, then the system proceeds to block 512.

At block 512, the system determines a gradient based on the loss(es) determined at iteration(s) of block 508, and provides the gradient to a parameter server for updating parameters of the critic network based on the gradient. The system then proceeds back to block 504 and performs additional iterations of blocks 504, 506, 508, and 510, and determines an additional gradient at block 512 based on loss(es) determined in the additional iteration(s) of block 508.

In various implementations, method 500 can be parallelized across a plurality of separate processors and/or threads. Also, although method 200, 300, 400, and 500, it is understood that in many implementations they are performed in parallel during reinforcement learning.

Figure 6:
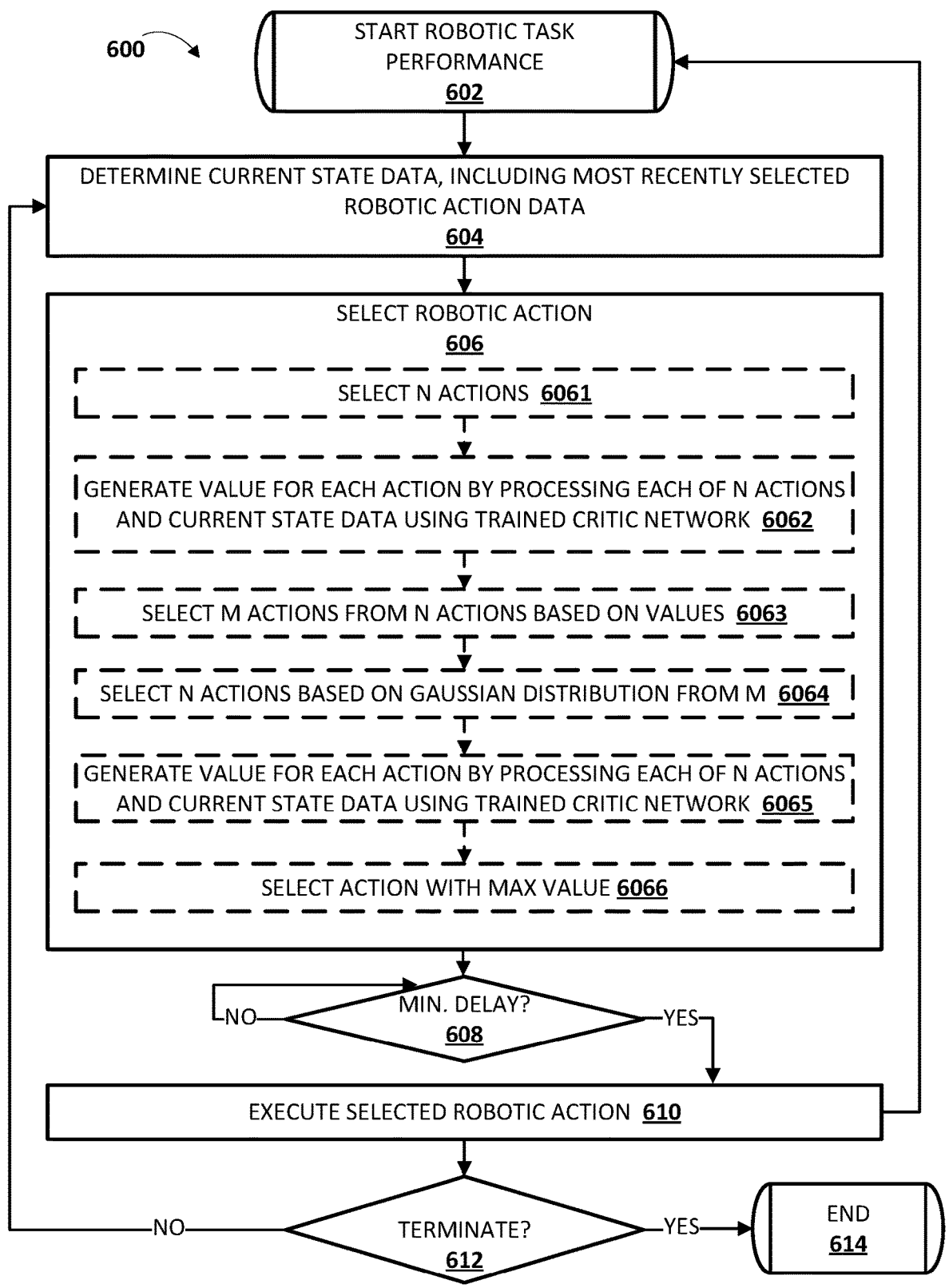
FIG. 6 is a flowchart illustrating an example method of performing a robotic task using a trained critic network.

FIG. 6 is a flowchart illustrating an example method 600 of performing a robotic task using a trained critic network. The trained critic can be trained, for example, based on methods 200, 300, 400, and 500 of FIGS. 2-6. For convenience, the operations of the flow chart are described with reference to a system that performs the operations. This system may include one or more components of one or more robots, such as one or more processors of one of robots 180A and 180B. Moreover, while operations of method 600 are shown in a particular order, this is not meant to be limiting. One or more operations may be reordered, omitted or added.

At block 602, the system starts performance of a robotic task.

At block 604, the system determines current state data, including most recently selected robotic action data. At an initial iteration of block 604 the most recently selected robotic action data can be a zero vector or other "null"

indication as there are no previously selected robotic action(s) at the initial iteration. The current state data can also include, for example, vision data captured by a vision component associated with the robot and/or current state(s) of robotic component(s). As described herein, when the most recently selected robotic action data is a difference between a target state of robotic component(s) (to be achieved based on the most recently selected robotic action) and a current state of the robotic component(s), the current state can be selected based on it corresponding most closely (temporally) to the current vision data. For example, the current state of the robotic component(s) may not be based on the most recent data available in a state buffer but, instead, the data that has a timestamp that is closest to a timestamp of the most recent vision data instance in a vision data buffer (which may populate at a lower frequency than the state buffer).

At block 606, the system selects a robotic action to perform the robotic task. In some implementations, the system selects the robotic action using stochastic optimization techniques as described herein. In some implementations, the stochastic optimization technique is CEM and, in some of those implementations, block 606 may include one or more of the following sub-blocks.

At sub-block 6061, the system selects N actions, where N is an integer number.

At sub-block 6062, the system generates a value for each action by processing each of the N actions and the current state data (including most recently selected robotic action data) using the trained critic network.

At sub-block 6063, the system selects M actions from the N actions based on the generated values, where M is an integer number.

At sub-block 6064, the system selects N actions based on a Gaussian distribution from the M actions.

At sub-block 6065, the system generates a value for each action by processing each of the N actions and the current state data (including most recently selected robotic action data) using the trained critic network.

At sub-block 6066, the system selects a max value from the values generated at sub-block 6065.

At block 608, the system determines whether a minimum amount of delay has been achieved. In some implementations, the minimum amount of delay is relative to initiation of a most recent iteration of block 606 during the robotic task performance and/or relative to initiation of a most recent iteration of block 608 (described below) during the robotic task performance. In some implementations, block 608 can optionally be omitted at least in an initial iteration of block 608 during the online task episode.

At block 610, the robot executes the selected robotic action.

At block 612, the system determines whether to terminate performance of the robotic task. In some implementations and/or situations, the system can terminate the performance of the robotic task if the robotic action at a most recent iteration of block 606 indicated termination. In some additional or alternative implementations and/or situations, the system can terminate the episode if a threshold quantity of iterations of blocks 604, 606, 608, and 610 have been performed for the performance and/or if other heuristics based termination conditions have been satisfied.

If the system determines, at block 610, not to terminate, then the system performs another iteration of blocks 604, 606, 608, and 610. If the system determines, at block 610, to terminate, then the system proceeds to block 614 and ends performance of the robotic task.

Various machine learning architectures can be utilized for the critic network. In various implementations any vision data, of current state data, can be processed utilizing a first branch of the critic network to generate a vision data embedding. Further, the most recently selected robotic action data (of the current state data) can be processed utilizing a second branch of the critic network, along with a candidate robotic action to be considered and optionally other current state data (e.g., that indicates whether a gripper is open/closed/between open and closed), to generate an additional embedding. The two embeddings can be concatenated (or otherwise combined) and processed utilizing additional layer(s) of the model to generate a corresponding value.

Figure 7:
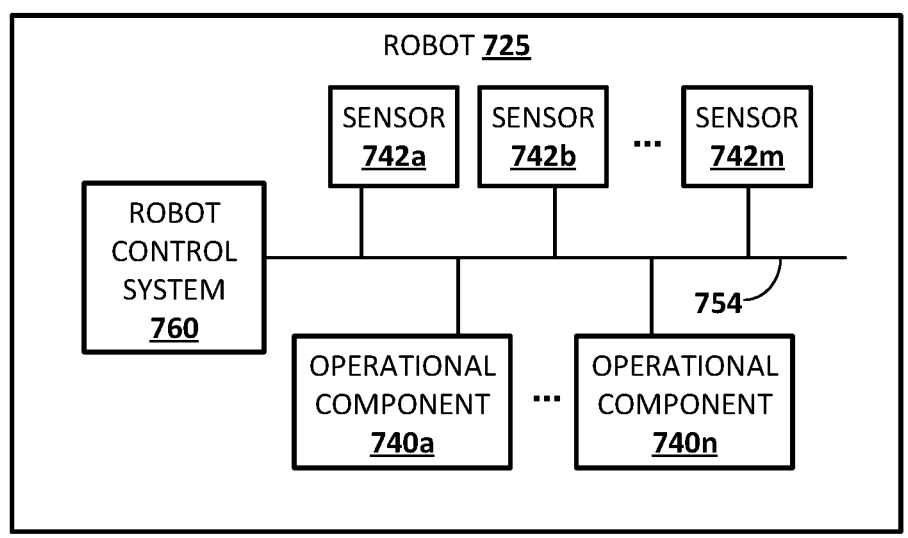
FIG. 7 schematically depicts an example architecture of a robot.

FIG. 7 schematically depicts an example architecture of a robot 725. The robot 725 includes a robot control system 760, one or more operational components 740a-740n, and one or more sensors 742a-742m. The sensors 742a-742m may include, for example, vision sensors, light sensors, pressure sensors, pressure wave sensors (e.g., microphones), proximity sensors, accelerometers, gyroscopes, thermometers, barometers, and so forth. While sensors 742a-742m are depicted as being integral with robot 725, this is not meant to be limiting. In some implementations, sensors 742a-742m may be located external to robot 725, e.g., as standalone units.

Operational components 740a-740n may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740a-740n, with each of the real time bursts comprising a set of one or more control commands that dictate, inter alio, the parameters of motion (if any) for each of one or more of the operational components 740a-740n. In some implementations, the robot control system 760 may perform one or more aspects of methods 300 and/or 600 described herein.

As described herein, in some implementations all or aspects of the control commands generated by control system 760 in performing a robotic task can be based on an action selected based on current state (e.g., based at least on most recently selected robotic action data, and optionally current vision data) and based on utilization of a trained critic network as described herein. Stochastic optimization techniques can be utilized in selecting an action at each time step of controlling the robot. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
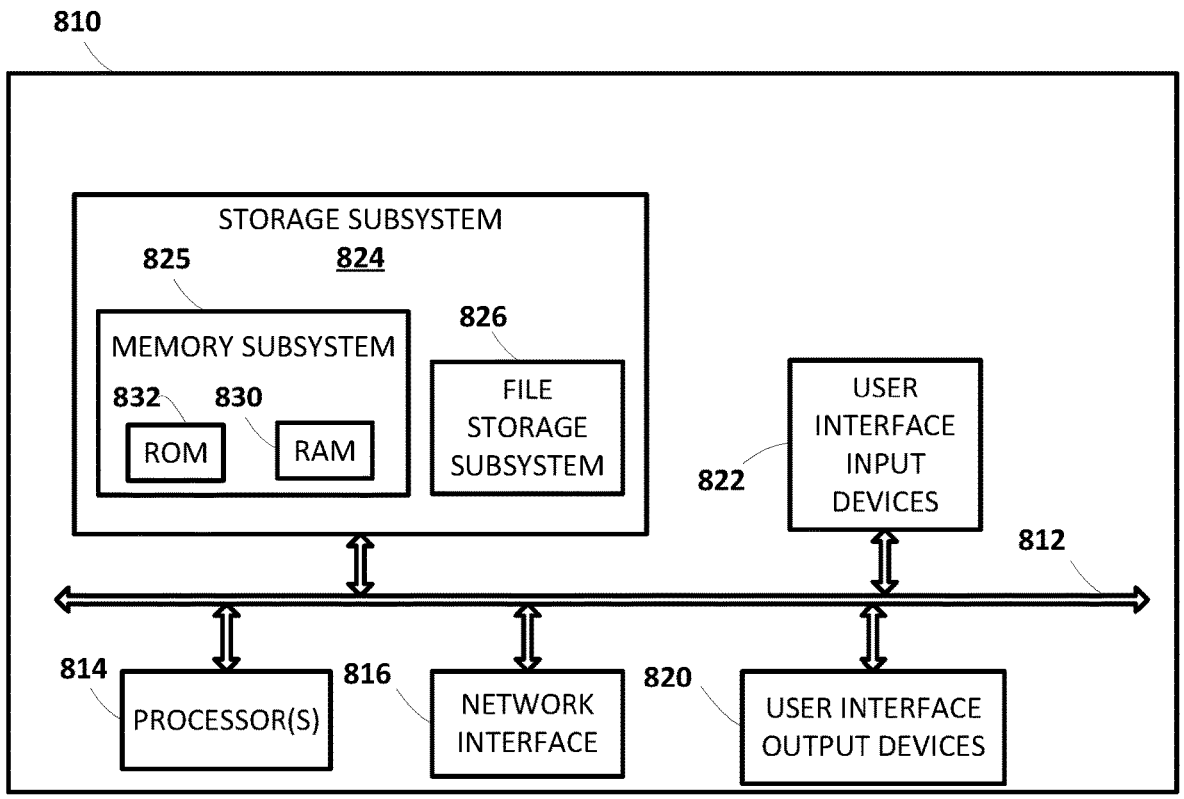
FIG. 8 schematically depicts an example architecture of a computer system.

FIG. 8 is a block diagram of an example computing device 810 that may optionally be utilized to perform one or more aspects of techniques described herein. For example, in some implementations computing device 810 may be utilized to provide desired object semantic feature(s) for grasping by robot 925 and/or other robots. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 924 may include the logic to perform selected aspects of the method of FIGS. 2, 3, 4, 5, and/or 6.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method implemented by one or more processors of a robot during performance of a robotic task is provided and includes controlling a robot to implement a most recently selected robotic action that was determined based on processing, utilizing a trained neural network model that represents a learned value function, of the robotic action and of prior vision data captured by a vision component of the robot. The most recently selected robotic action defines a target next state of the robot in performance of the robotic task. The method further includes, during the controlling of the robot to implement the most recently selected robotic action and prior to the robot achieving the target next state defined by the most recently selected robotic action: (a) identifying current vision data that is captured by the vision component during the controlling of the robot to implement the most recently selected robotic action and prior to the robot achieving the target next state of the robot defined by the most recently selected robotic action; (b) identifying a candidate next robotic action; (c) processing, utilizing the trained neural network model, the current vision data, the candidate next robotic action, and most recently selected robotic action data; (d) generating a value for the candidate next robotic action based on the processing; and (e) selecting the candidate next robotic action based on the value. The most recently selected robotic action data includes the most recently selected robotic action, and/or a difference between the target next state of the robot and a current state of the robot that temporally corresponds to the current vision data. The method further includes controlling the robot to implement the selected candidate next robotic action.

These and other implementations may include one or more of the following features.

In some implementations, the most recently selected robotic action data includes the difference between the target next state of the robot and the current state of the robot that temporally corresponds to the current vision data. In some of those implementations, the method further includes: selecting the current vision data based on it being most recently captured and buffered in a vision data buffer; and selecting the current state of the robot, for use in determining the difference, based on a current state timestamp, for the current state, being closest temporally to a vision data timestamp of the current vision data. For example, selecting the current state of the robot can include selecting the current state of the robot in lieu of a more recent state of the robot that is more up to date than the current state, based on the current state of the robot being closer temporally to the vision data timestamp than is the more recent state of the robot.

In some implementations, controlling the robot to implement the selected candidate next robotic action includes determining a particular control cycle at which to begin controlling the robot to implement the selected candidate next robotic action. Determining the particular control cycle can be based on determining whether a minimum amount of time and/or control cycles have passed. The minimum amount of time and/or control cycles can optionally be relative to initiation of generating the value for the candidate next robotic action, and/or beginning controlling the robot to implement the most recently selected robot action. Optionally, the particular control cycle is not a control cycle that immediately follows selecting the candidate next robotic action.

In some implementations, controlling the robot to implement the selected candidate next robotic action occurs prior to the robot achieving the target next state.

In some implementations, controlling the robot to implement the selected candidate next robotic action occurs in a control cycle that immediately follows the robot achieving the target next state.

In some implementations, the method further includes, during the controlling of the robot to implement the most recently determined robotic action and prior to the robot achieving the target next state defined by the most recently determined robotic action: identifying an additional candidate next robotic action; processing, utilizing the trained neural network model, the current vision data, the additional candidate next robotic action, and the most recently selected robotic action data; and generating an additional value for the additional candidate next robotic action based on the processing. In those implementations, selecting the candidate next robotic action is based on comparing the value to the additional value.

In some implementations, the candidate next robotic action includes a pose change for a component of the robot. In some of those implementations, the component is an end effector and the pose change defines a translation difference for the end effector and a rotation difference for the end effector. For example, the end effector can be a gripper and the robotic task can be a grasping task.

What is claimed is:

1. A method implemented by one or more processors of a robot during performance of a robotic task, the method comprising:
   controlling a robot to implement a most recently selected robotic action that was determined based on processing, utilizing a trained neural network model that represents a learned value function, of the most recently selected robotic action and of prior vision data captured by a vision component of the robot, wherein the most recently selected robotic action defines a target next state of the robot in performance of the robotic task;
   during the controlling of the robot to implement the most recently selected robotic action and prior to the robot achieving the target next state defined by the most recently selected robotic action:
      identifying current vision data that is captured by the vision component during the controlling of the robot to implement the most recently selected robotic action and prior to the robot achieving the target next state of the robot defined by the most recently selected robotic action;
      identifying a candidate next robotic action;
      processing, utilizing the trained neural network model, the current vision data, the candidate next robotic action, and most recently selected robotic action data,
         wherein the most recently selected robotic action data comprises:
            the most recently selected robotic action,
            a difference between the target next state of the robot and a current state of the robot that temporally corresponds to the current vision data, or
            both the most recently selected robotic action and the difference;
      generating a value for the candidate next robotic action based on the processing; and
      selecting the candidate next robotic action based on the value; and
   controlling the robot to implement the selected candidate next robotic action.

2. The method of claim 1, wherein the most recently selected robotic action data comprises the difference between the target next state of the robot and the current state of the robot that temporally corresponds to the current vision data.

3. The method of claim 2, further comprising:
   selecting the current vision data based on it being most recently captured and buffered in a vision data buffer; and
   selecting the current state of the robot, for use in determining the difference, based on a current state timestamp, for the current state, being closest temporally to a vision data timestamp of the current vision data.

4. The method of claim 3, wherein selecting the current state of the robot comprises selecting the current state of the robot in lieu of a more recent state of the robot that is more up to date than the current state, based on the current state of the robot being closer temporally to the vision data timestamp than is the more recent state of the robot.

5. The method of claim 1, wherein controlling the robot to implement the selected candidate next robotic action comprises:
   determining a particular control cycle at which to begin controlling the robot to implement the selected candidate next robotic action, wherein determining the particular control cycle is based on determining whether a minimum amount of time has passed, an amount of control cycles have passed, or the amount of time and the amount of control cycles have passed.

6. The method of claim 5, wherein the minimum amount of time and/or control cycles are relative to:
   initiation of generating the value for the candidate next robotic action,
   beginning controlling the robot to implement the most recently selected robot action, or
   both initiation of generating the value for the candidate next robotic action and beginning controlling the robot to implement the most recently selected robot action.

7. The method of claim 6, wherein the particular control cycle is not a control cycle that immediately follows selecting the candidate next robotic action.

8. The method of claim 1, wherein controlling the robot to implement the selected candidate next robotic action occurs prior to the robot achieving the target next state.

9. The method of claim 1, wherein controlling the robot to implement the selected candidate next robotic action occurs in a control cycle that immediately follows the robot achieving the target next state.

10. The method of claim 1, further comprising, during the controlling of the robot to implement the most recently determined robotic action and prior to the robot achieving the target next state defined by the most recently determined robotic action:
    identifying an additional candidate next robotic action;

processing, utilizing the trained neural network model, the current vision data, the additional candidate next robotic action, and the most recently selected robotic action data; and generating an additional value for the additional candidate next robotic action based on the processing;

wherein selecting the candidate next robotic action is based on comparing the value to the additional value.

11. The method of claim 1, wherein the candidate next robotic action comprises a pose change for a component of the robot.

12. The method of claim 11, wherein the component is an end effector and the pose change defines a translation difference for the end effector and a rotation difference for the end effector.

13. The method of claim 12, wherein the end effector is a gripper and the robotic task is a grasping task.

14. A robot, comprising:
a vision sensor viewing an environment;
actuators;
a trained neural network model stored in one or more non-transitory computer readable media, the trained neural network model representing a learned value function;
at least one processor configured to:
control one or more of the actuators to implement a most recently selected robotic action that was determined based on processing, utilizing the trained neural network model, of the most recently selected robotic action and of prior vision data captured by a vision component of the robot, wherein the most recently selected robotic action defines a target next state of the robot in performance of the robotic task;
during the control of the actuators to implement the most recently selected robotic action and prior to the robot achieving the target next state defined by the most recently selected robotic action:
identify current vision data that is captured by the vision component during the controlling of the robot to implement the most recently selected robotic action and prior to the robot achieving the target next state of the robot defined by the most recently selected robotic action;
identify a candidate next robotic action;
process, utilizing the trained neural network model, the current vision data, the candidate next robotic action, and most recently selected robotic action data,
wherein the most recently selected robotic action data comprises:
the most recently selected robotic action,
a difference between the target next state of the robot and a current state of the robot that temporally corresponds to the current vision data, or
both the most recently selected robotic action and the difference;
generate a value for the candidate next robotic action based on the processing; and
select the candidate next robotic action based on the value; and
control the robot to implement the selected candidate next robotic action.

15. The robot of claim 14, wherein the most recently selected robotic action data comprises the difference between the target next state of the robot and the current state of the robot that temporally corresponds to the current vision data.

16. The robot of claim 15, wherein the at least one processor is further configured to:
select the current vision data based on it being most recently captured and buffered in a vision data buffer; and
select the current state of the robot, for use in determining the difference, based on a current state timestamp, for the current state, being closest temporally to a vision data timestamp of the current vision data.

17. The robot of claim 16, wherein in selecting the current state of the robot one or more of the processors are to select the current state of the robot in lieu of a more recent state of the robot that is more up to date than the current state, based on the current state of the robot being closer temporally to the vision data timestamp than is the more recent state of the robot.

18. The robot of claim 14, wherein in controlling the actuators to implement the selected candidate next robotic action one or more of the processors are to:
determine, based on determining whether a minimum amount of time or control cycles have passed, a particular control cycle at which to begin controlling the actuators to implement the selected candidate next robotic action.

19. The robot of claim 14, wherein controlling the actuators to implement the selected candidate next robotic action occurs prior to the robot achieving the target next state.

20. The robot of claim 14, wherein controlling the actuators to implement the selected candidate next robotic action occurs in a control cycle that immediately follows the robot achieving the target next state.

* * * * *